US008002181B2

(12) United States Patent
Ulrich et al.

(10) Patent No.: US 8,002,181 B2
(45) Date of Patent: Aug. 23, 2011

(54) RFID PROMOTIONAL COMPLIANCE

(75) Inventors: Richard Bennett Ulrich, Bentonville, AR (US); Simon David Langford, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 227 days.

(21) Appl. No.: 12/196,994

(22) Filed: Aug. 22, 2008

(65) Prior Publication Data

US 2009/0101712 A1    Apr. 23, 2009

Related U.S. Application Data

(60) Provisional application No. 60/957,758, filed on Aug. 24, 2007.

(51) Int. Cl.
*G06K 15/00* (2006.01)
(52) U.S. Cl. ...................................................... 235/383
(58) Field of Classification Search .................. 235/383, 235/385, 492; 705/26.1
See application file for complete search history.

(56) References Cited

U.S. PATENT DOCUMENTS

| | | | | |
|---|---|---|---|---|
| 5,880,449 | A | * | 3/1999 | Teicher et al. ................. 235/383 |
| 6,715,675 | B1 | * | 4/2004 | Rosenfeld .................... 235/383 |
| 6,837,427 | B2 | | 1/2005 | Overhultz et al. |
| 6,951,305 | B2 | | 10/2005 | Overhultz et al. |
| 7,021,535 | B2 | | 4/2006 | Overhultz et al. |
| 2002/0046128 | A1 | * | 4/2002 | Abe et al. ......................... 705/26 |
| 2005/0139662 | A1 | * | 6/2005 | Eglen et al. .................... 235/383 |

OTHER PUBLICATIONS

International Search Report of related International Application No. PCT/US08/74259, dated Jun. 3, 2009.

* cited by examiner

*Primary Examiner* — Seung H Lee
(74) *Attorney, Agent, or Firm* — Kenyon & Kenyon LLP

(57) ABSTRACT

A method using radio frequency identification (RFID) tags for managing a promotional merchandise display at locational spots in a store includes providing a locational spot in the store with a locational RFID tag uniquely identifying the locational spot, providing the locational spot with the promotional merchandise display associated with merchandise RFID tags, wherein each of the merchandise RFID tags uniquely identifies one or more products in the promotional merchandise display, scanning for radio frequency signals from the locational RFID tag and the merchandise RFID tags at or near the locational spot, transmitting information obtained from the scanning to a server, analyzing the information at the server for a determination of whether the promotional merchandise display is in compliance with a promotional display plan; and if not, generating a notice to the store, the notice including information relating to the locational spot and the promotional merchandise display.

19 Claims, 2 Drawing Sheets

RFID PROMOTIONAL COMPLIANCE

CROSS-REFERENCE TO RELATED APPLICATIONS

This application claims priority to U.S. Provisional Patent Application No. 60/957,758, filed Aug. 24, 2007, entitled "RFID Promotional Compliance," which is herein incorporated by reference in its entirety.

FIELD OF THE INVENTION

The present invention relates to a method for managing promotional merchandise displays using Radio Frequency Identification (RFID) tags. In particular, the present invention relates to a method for collecting and analyzing information from locational RFID tags associated with hot spots in a store and information from merchandise RFID tags associated with promotional merchandise displays for a determination whether promotional merchandise displays are in compliance with a promotional display plan.

BACKGROUND INFORMATION

Suppliers of products, e.g., consumer goods, often promote particular merchandise through a retail store at a discount over a specific period of time. The promotional merchandise may be displayed in special promotional merchandise displays to increase sales or awareness of a particular brand, product, or type of products. The success of promotional merchandise displays often depends on timely stocking merchandise, display durations, and specific placement within a store in coordination with shopping seasons, marketing campaigns, and store layout. A successful promotional merchandise display may maximize sales for that merchandise.

Products of promotional merchandise displays may first be shipped to a store storage or backroom with a specific range of time for moving out to the sales floors or on shelves. Meeting or exceeding promotional sales targets of the retailer or the supplier may depend on shipping promotional merchandise displays to right spots in the store at the right time. On the other hand, a poor execution of promotional merchandise displays may lead to customer dissatisfactions and/or missing sales targets. For example, if the promotional merchandise displays are not moved into right spots in time, customers may be frustrated because they could not purchase the product advertised, e.g., on TV or in the newspaper.

In addition to the timing factor, the sales floor or shelves in a store may be classified according to their desirability for selling merchandise. Locations desirable for selling merchandise may be referred to as "hot spots." These hot spots are often locations for promotional merchandise displays because typically merchandise sells better at these hot spots than at other locations. These hot spots in a store may be locations close to main entrances or main pathways, or even shelve levels that are easier for customers to retrieve merchandise.

SUMMARY

The present invention provides a method using RFID tags for systematically managing promotional merchandise displays at a retail store. Information collected from RFID tags identifying locations in a store, e.g., hot spots, and identifying promotional merchandise displays may be used to monitor timely stocking promotional merchandise, e.g., from storage to hot spots on the sales floor or from hot spots to customers who have purchased the merchandise. Further, the collected information may be analyzed to determine whether a promotional merchandise display is carried out as planned. The method for RFID promotional merchandise display may verify how long the promotional merchandise display has been properly displayed and may track which product in the promotional display has been purchased by customers. Statistics on how merchandise flows, e.g., from storage to hot spots or from the sales floor to customers, gathered by the RFID promotional compliance method may be analyzed to report how effective a promotional display is. Exemplary statistics may include how many items have been sold per day or week from a promotional display, or how effective a particular hot spot is with respect to a particular product. Comparison may also be made with respect to similar or different products sold at different hot spots in the store or at different times during the same year.

Every hot spot location in a store may be tagged with an RFID tag uniquely identifying the hot spot. These hot spot locations may be a shelf or simply a pallet that is located on the store floor. The objective of a promotional merchandise display may be to move promotional merchandise to these RFID tag enabled hot spot locations for its promotional period.

Further, RFID tags may be associated with promotional merchandise displays, e.g., by pre-tagging merchandise with RFID tags before it is shipped to a store. When a promotional display is moved out onto the sales floor or shelves, an employee may scan tags associated with the promotional merchandise displays and tags associated with hot spots with an RFID data collection device, e.g., a Gen-2 RFID scanner. The information collected from both the locational RFID tags and merchandise RFID tags may then be transmitted to a computer server where the tag information from promotional displays may be systematically correlated with physical hot spots in the store to associate the promotional merchandise displays with hot spots.

The collection of the RFID tag information may be carried out actively, e.g., by an employee walking through the store and scanning RFID tags using a handheld RFID scanner, or passively, e.g., by collecting RFID tag information using an RFID scanner mounted on a mobile device, e.g., a floor cleaner, a fork lift, or even a wearable device. By comparing the determined physical locations of the promotional displays to a schedule plan of the promotional display stored in a database, the store may monitor and ensure a proper execution of a promotional merchandise display.

The information of locational RFID tags placed in a store may be maintained in a database that specifies the location of each RFID tag. The present invention may scan and read at the same or approximately the same time the RFID tags associated with the promotional merchandise display and the locational RFID tags associated with hot spots. Features such as the number of tag readings per time unit, time of scans recorded, e.g., using timestamps, and RFID signal strength may be used to mitigate stray RFID reads and to reduce the likelihood of associating a promotional merchandise display with an erroneous location. For example, a comparison of the timestamps of the product RFID tags with those of the locational RFID tags may indicate which tags were seen at the same location. In another example, by examining the signal strength from the RFID tags, RFID tags with weak responses may be eliminated from consideration.

The present invention may provide the following benefits: for retailers, the present invention may ensure promotional merchandise on the sales floor at the specified time and at the correct location, provide the ability to measure an execution of promotional merchandise displays across chain stores, be able to react in a timely manner to ensure the planned promotional merchandise displays, provide proof and assurance to suppliers that their products have been moved from storage to the sales floor properly, and maximize sales; for suppliers, the present invention may provide the ability to measure the effectiveness of a promotional campaign and its correlation to sales; for customers, the present invention may ensure that the promotional merchandise is on the sales floor and accessible to customers.

DETAILED DESCRIPTION OF EXAMPLE EMBODIMENTS

Figure 1:
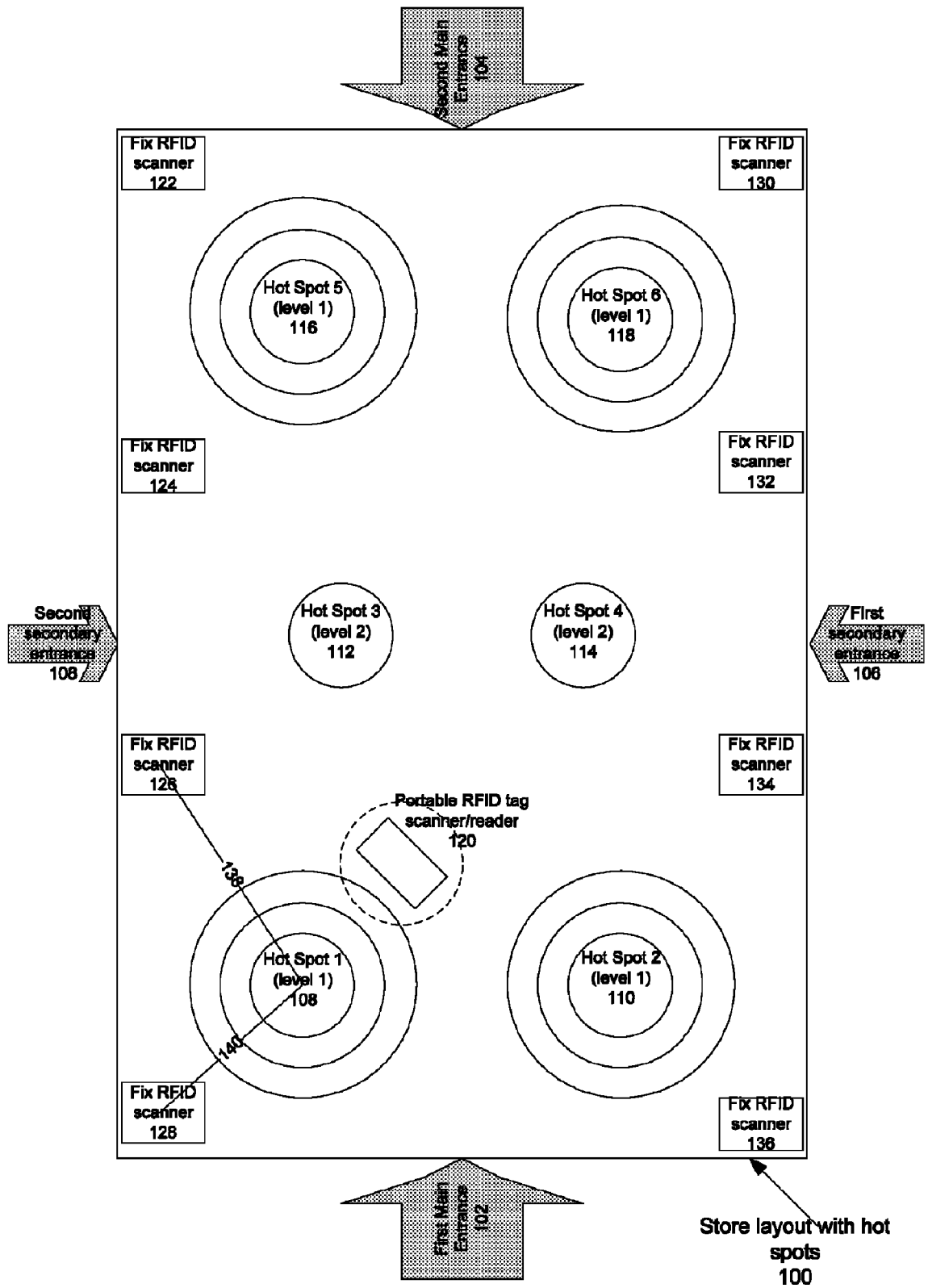
FIG. 1 shows an example store layout with hot spots and example RFID tag scanners according to one example embodiment of the present invention.

FIG. 1 illustrates an example store layout with hot spots and example RFID tag scanners according to one example embodiment of the present invention. A retail store 100, e.g., a Wal-Mart store, may have multiple entrances. The entrances to the retail store may be classified into, e.g., main entrances 102, 104 and secondary entrances 106, 108 according to their respective locations and volumes of customers going through.

Within the store, merchandise may be placed, e.g., on shelves or pallets at different spots accessible by customers through different pathways. Some spots of the store floor or shelves, because of, e.g., their proximity to main entrances or to main pathways may be more accessible to customers than other spots and thus more valuable to the store. These more accessible spots are herein referred to as hot spots 108, 110, 112, 114, 116, and 118. For example, when a customer walks in store 100 from the first main entrance 102, the customer may immediately encounter merchandise placed at hot spots 108 and 110. Similarly, a customer who walks through the second main entrance 104 may encounter hot spots 116 and 118. Hot spots may also be classified into categories according to potential values they may provide to the store. For example, hot spots 108, 110, 116 and 118 near the main entrances 102 and 104 may be characterized as level-1 hot spots because of their proximity to the main entrances. Hot spots 112 and 114 may be characterized as level-2 hot spots because of their proximity to the secondary entrances 106 and 108. In this example embodiment, level-1 hot spots are more valuable than level-2 hot spots. In different embodiments of the present invention, the number of levels of hot spots may vary. In addition to store floors, hot spots may include shelves, pallets, walls or any other types of surfaces on which merchandise may be displayed for sale. Therefore, hot spots are not limited to two dimensional partitions of the store floor. They may also include consideration of height. For example, even within the same rack of shelves, the mid shelves may be a hot spot because they are easily accessible while the top and bottom shelves are not.

Whether an area is a hot spot and if it is, of what level, may be determined based on experience or sales history. For example, the volume of merchandise sold at a locational spot over holiday seasons may be a good indicator whether the spot is a hot spot and if it is, which level of a hot spot.

Each hot spot may be identified with an RFID tag with a serial number uniquely identifying the tag. For illustration purpose and convenience, FIG. 1 shows six hot spots uniquely labeled as Hot Spots 1-6. According to one embodiment of the present invention, the locations of hot spots may be represented as a coordinate in a store map coordinate system (not shown) with its origin at, e.g., the center of the store. Each of the labeled hot spots may then be associated with a coordinate and stored in a database. The coordinates of hot spots may be mapped out with a portable RFID tag scanner 120. For example, a store employee may walk through each hot spot with a handheld RFID scanner, e.g., a Gen-2 RFID reader, and label the coordinate of hot spots with unique RFID tag serial numbers.

In an alternative embodiment, a store may install a number of fix RFID scanners 122, 124, 126, 128, 130, 132, 134, and 136. The coordinates of these fix RFID scanners relative to the origin of the store map may have been measured in advance. Each of the fix RFID scanners may then receive the transmission of RFID signals of different strengths or number of receptions per time unit. A strong RFID signal of a serial number may indicate that the RFID tag of the serial number is close to the scanner. Conversely, a weak RFID signal may indicate an RFID tag is farther away. Similarly, a high number of receptions per unit time of RFID signal may indicate that the RFID tag is close. Conversely, a low number of receptions per unit time of RFID signals may indicate a farther away RFID tag.

The coordinates of hot spots may be calculated based on a triangulation from the fix RFID scanners. In one example embodiment of the present invention, fix RFID scanners 126 and 128 may receive RFID signals from Hot Spot 1 associated with a unique serial number. Based on the strength and/or number of receptions of the RFID signal, a distance 138 from the Hot Spot 1 to the fix RFID scanner 126 and a distance 140 from the Hot Spot 1 to the fix RFID scanner 128 may be estimated. The coordinate of the Hot Spot 1 relative to the origin of the store map may be calculated based on a triangulation from the fix RFID scanners 126 and 128 which may be near to the Hot Spot 1.

Upon a determination of the locations of hot spots, the coordinates of these hot spots may be stored in a database associated with a server computer. In one example embodiment of the present invention, the locations of hot spots may be stored as a list in which each hot spot is correspondingly recorded with its coordinates and RFID tag information. Alternatively, the locations of hot spots may be stored as a table, an array or any other forms of data structures in the database.

Figure 2:
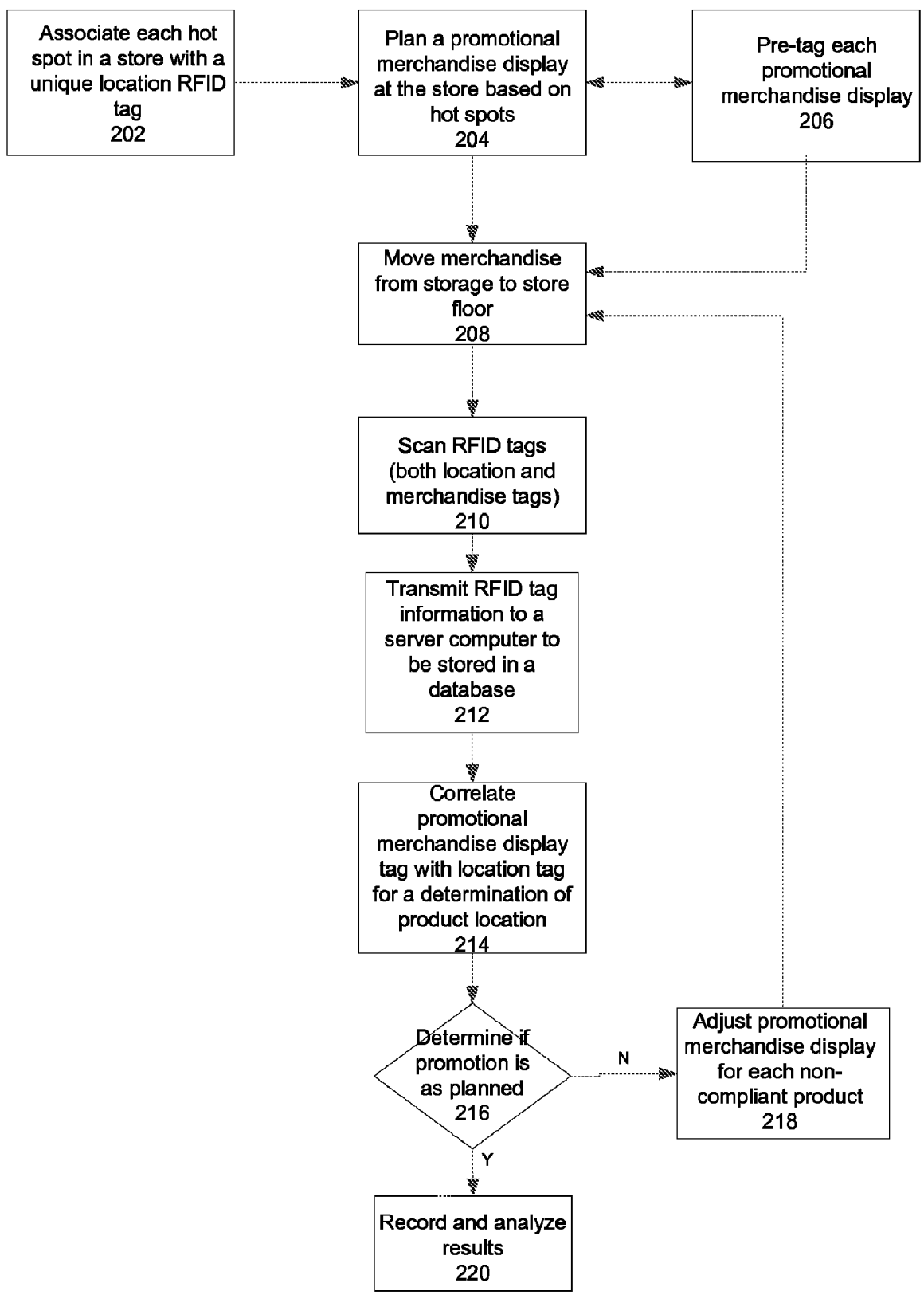
FIG. 2 shows an example RFID promotion compliance method for managing a promotional merchandise display according to one example embodiment of the present invention.

FIG. 2 shows an example RFID promotion compliance method for managing a promotional merchandise display according to one example embodiment of the present invention. As explained above, at 202, each hot spot in a store may be associated with a unique RFID tag. The unique location RFID may indicate the location of a hot spot and be stored in a database. A supplier may have pre-tagged promotional merchandise displays with RFID tags identifying the merchandise before it is shipped to the store 206. Upon receiving instructions from the supplier on timing and quantities of merchandise to be placed on a promotional display, the store may create a schedule plan for the promotional merchandise display 204 based on specifications from suppliers and hot spots availability. The schedule plan may include when and where promotional merchandise may be moved from storage to store floor or shelves. Merchandise may be stocked from storage to store floor or on shelves 208.

According to one embodiment of the present invention, both locational and merchandise RFID tags may be scanned during the normal operation of the store. The scan may be carried out actively, e.g., by an employee walking through the store with a handheld RFID scanner. Alternatively, the scan may be carried out passively, e.g., by wall-mounted RFID scanners as illustrated in FIG. 1. The wall-mounted RFID scanners may read the locational and the merchandise RFID tags at regular time intervals, e.g., hourly or daily, or based on an instruction by a human operator. An RFID scanner may also be installed on a mobile device, e.g., on a cleaning device or worn on the uniform of an employee. In this way, both the locational and merchandise RFID tags may be read ubiquitously over time and location.

As discussed above, each locational RFID tag uniquely identifies each hot spot within a store. Similarly, each merchandise RFID tag may identify one or more merchandise associated with the tag. For example, a merchandise RFID tag may be used to identify different classes of merchandise including, e.g., at a display level (all products in a display), at a pallet level (all products on a pallet), at a group level (a group of products), or at the individual product level (each individual product may be separately identified). For example, if a product has a GTIN (global trade identification number) that represents the pallet level of a product, a different GTIN that represents the group level of a product, and yet another GTIN, or a UPC that represents the selling unit of the product. Each of these different GTIN levels could be encoded in an RFID tag thus providing the reader of the tag with the ability to know the group and the level of the RFID tag that was just read, along with a unique serial number. The GTIN information may be stored in a table to allow the store to know which product, whether it was sold using a barcode system or not, was related to which promotional merchandise display. For example, a locational tag table may, at a first level, include a measured RF signal strength indicator (RSSI) for each locational RFID tag. At a second level, the table may include associations from locational RFID tags to hot spots. At a third level, the locational tag table may include a schedule of products that should be placed at a hot spot during a time period. A product tag table may, at a first level, include product tag information relating to, e.g., pallets. An examination of the relationship between locational RFID tags and product RFID tags may reveal whether a product is placed at the right hot spot at the right time.

In addition to recording the unique RFID tags and their locations, times of RFID scans, e.g., in the form of timestamps, may also be recorded for a determination of rollout and winding-down of a promotional display campaign at hot spots. In one example embodiment of the present invention, the timestamp may be a data structure stored on a computer-readable medium, e.g., a memory or hard drive, where the data structure includes a unique RFID associated with recordings of times when the RFID tag is scanned. In this way, the duration of merchandise at a hot spot or durations at multiple hot spots may be calculated from the timestamps. Further, the present invention may record information captured during the sale of promotional merchandise, e.g., by scanning merchandise RFID tag at checkout counters. In an alternative embodiment of the present invention, the sale information may be captured by a Point of Sale (POS) tag reader system, e.g., a barcode reader. This may be accomplished by any POS system that may correlate a promotional display product to a particular tracked promotional display. For example, this may be accomplished by knowing the barcoded UPC of the products that were shipped with the RFID tagged promotional display. It is also possible to distinguish these products (hot spot promotional) from other similar products by simply having different barcoded UPC information for the promotional products as compared to those that are normally stocked in the retail store.

The information captured from locational and merchandise RFID tags may be transmitted to a server computer (not shown) through communication channels to be stored in a database 212. In a preferred embodiment of the present invention, the captured information may include RFID serial number, RFID signal strengths, and timestamps. The transmission may be wired, e.g., by connecting to the fix RFID scanners mounted on walls, or wireless, e.g., using Wi-Fi or any suitable wireless connection standards.

The server computer may be on site at the store or may be located separately in a centralized location to multiple stores. The server computer may execute computer codes to generate a correlational data structure based on the locational information and merchandise information 214. The correlational data may associate promotional merchandise displays with hot spots. An example of the correlational data structure is provided for in the following tables. For example, Table 1 shows that RSSI of locational RFID tags may be measured and recorded during the installation of locational RFID tags. The measured RSSI of locational RFID tags may be a reference to determine how close the RFID scanner is from the locational RFID tag for a determination of which tag may be the closest to the RFID scanner if multiple locational RFID tags are detected.

TABLE 1

An example of locational RFID tags.

| Locational Tag Id | Recorded Return signal strength Indicator (RSSI) |
|---|---|
| T1 | −45 |
| T2 | −47 |
| T2 | −52 |
| T4 | −56 |

Table 2 shows locational RFID tags are associated with hot spot locations.

TABLE 2

An example of locational tags associated with hot spots

| Location Tag Id | Hot Spot Location |
|---|---|
| T1 | Hot Spot 4 |
| T2 | Hot Spot 1 |
| T3 | Hot Spot 2 |
| T4 | Hot Spot 3 |

Further, products represented by stock keeping unit (SKU) numbers may be associated with different level of RFID tags. For example, Table 3 shows that product x of SKU 1 may be associated with group 123, pallet 345, and selling unit 567, and product y of SKU 3 may be associated group 112, pallet 223, and selling unit 242.

TABLE 3

An example of products associated with RFID tags of different levels

| SKU | GTIN | Tagging Level | Description |
|---|---|---|---|
| 1 | 123 | Group | Product x |
| 1 | 456 | Pallet | Product x |

TABLE 3-continued

An example of products associated with RFID tags of different levels

| SKU | GTIN | Tagging Level | Description |
|---|---|---|---|
| 1 | 567 | Selling unit | Product x |
| 3 | 112 | Group | Product y |
| 3 | 223 | Pallet | Product y |
| 3 | 242 | Selling unit | Product y |

Still further, a promotional merchandise display may be planned in a schedule table. Table 4 shows an example schedule table in which the Hot Spot 1 is scheduled to display promotional product SKU 1 from April 4 to April 18, and the Hot Spot 3 is scheduled to display promotional product SKU 3 from April 4 to April 18.

TABLE 4

An example of promotional display schedule

| Start Date | End Date | Hot Spot Location | SKU |
|---|---|---|---|
| 04/04 | 04/18 | Hot Spot 1 | 1 |
| 04/04 | 04/18 | Hot Spot 3 | 3 |

Based on Tables 1 to 4, an RFID scan of product tags at a hot spot may indicate the execution of a promotional merchandise display. For example, Table 5 shows an example RFID tag scan at Hot Spots 1 and 3 on April 5. The first row of Table 5 may indicate that at Hot Spot 4 (identified by locational RFID tag T1) is associated with product SKU 1 on a pallet 456. This information may indicate that the planned hot spot for product x has not been executed according the promotional display schedule based on Table 4. The second row of Table 5 may indicate that at Hot Spot 2 (identified by locational RFID tag T4) is associated with product SKU 3 on a pallet 223. This information may indicate that the planned hot spot for product y has been executed according the promotional display schedule based on Table 4.

TABLE 5

An example of RFID tag scans at hot spots.

| Tag Id | Product Tag ID |
|---|---|
| T1 | SKU.456.1 (the pallet id of 456 with a serial number of 1) |
| T4 | SKU.223.3 (the pallet id of 223 with a serial number of 3) |

The promotional display data collected with the above discussed method may further be recorded and analyzed 220. For example, The time from promotional display to sale may be calculated by comparing the information captured at sales with recorded timestamps for the RFID tag. For example, the present invention may record information captured during the sale of a promotional merchandise to determine how long the merchandise was on display before being sold. Specific tracking and transactional data may be maintained for each individual merchandise so that they may be used to determine when and where a product was sold or left the store. Information collected on merchandise displayed at all hot spots may also be compared to determine, e.g., the effectiveness in terms of selling products for each hot spot. The effectiveness may be measured in terms of selling volume and speed. The results of the analysis may be compiled as reports to show which hot spot is more desirable for a certain product. In one embodiment of the present invention, the report of promotional displays may include when a promotional display was rolled out to a particular location, how long the promotional display remained at the location, and when the promotional merchandise was sold, left the store, or returned to the storage. The report may also include information on sales of the same or similar products, e.g., manufactured by the same company or a competitor company, at different hot spot locations over the same time or at different times, e.g., different promotional seasons.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A method using radio frequency identification (RFID) tags for managing a promotional merchandise display at locational spots in a store, comprising:
   attaching a first plurality of RFID tags to a plurality of locational spots in the store, each of the first plurality of RFID tags uniquely identifying one of the locational spots;
   attaching a second plurality of RFID tags to the promotional merchandise display, each of the second plurality of RFID tags uniquely identifying one or more products in the promotional merchandise display;
   providing the promotional merchandise display and the second plurality of RFID tags attached thereto to the locational spots;
   at or near a locational spot in the store, scanning to detect radio frequency signals from the first and second plurality of RFID tags at or near the locational spot;
   transmitting information from a detected at least one of the first plurality of RFID tags and a detected at least one of the second plurality of RFID tags to a server;
   comparing the information against a promotional display plan, stored at the server, for a determination of whether the promotional merchandise display is in compliance with the promotional display plan, wherein the promotional display plan includes times and locations the promotional merchandise display is scheduled to appear at different locational spots and times in the store; and
   if the promotional merchandise display is not in compliance with the promotional display plan, generating a notice to the store, the notice including information relating to the locational spot and the promotional merchandise display.

2. The method of claim 1, wherein the locational spot in the store is a hot spot desirable for a product placement in the store.

3. The method of claim 1, wherein the each of the first RFID tags uniquely identifies the locational spot with a unique radio frequency.

4. The method of claim 1, wherein at least one of the first plurality of RFID tags uniquely identifies a single product.

5. The method of claim 1, wherein at least one of the first plurality of RFID tags uniquely identifies a group of products.

6. The method of claim 1, wherein the scanning is carried out with a handheld RFID reader.

7. The method of claim 6, wherein the RFID reader is a Gen-2 reader.

8. The method of claim 1, wherein the scanning is carried out with a plurality of RFID readers mounted on fix locations within the store.

9. The method of claim 1, wherein the scanning is carried out periodically or according to a schedule.

10. The method of claim 1, wherein the scanning is carried out ubiquitously by mounting RFID scanners on mobile objects in the store.

11. The method of claim 1, wherein the scanning of the first plurality of RFID tags and the second plurality of RFID tags at or near the locational spot is carried out at substantially the same time.

12. The method of claim 1, wherein the information obtained from the scanning includes at least one of an identifying data stored in RFID tags, strengths of the radio frequency signals from RFID tags and time of the scanning.

13. The method of claim 1, wherein the information obtained from the scanning is transmitted over a wireless communication channel.

14. The method of claim 1, wherein the information obtained from the scanning is transmitted immediately after the scanning.

15. The method of claim 1, wherein the information obtained from the scanning is transmitted in batch.

16. The method of claim 1, wherein the comparing of the information obtained from the scanning includes:

identifying information from the at least one of the first plurality of RFID tags and information from the at least one of the second plurality of RFID tags;

correlating the information from the at least one of the first plurality of RFID tags and the information from the at least one of the second plurality of RFID tags to generate a correlation data; and comparing the correlation data with the promotional display plan.

17. The method of claim 1, wherein the promotional display plan includes a schedule of the promotional merchandise display at the locational spot.

18. The method of claim 1, further comprising:

recording a sale of the product in a promotional merchandise display at a checkout counter;

correlating information of the sale with information obtained from the scanning from the at least one of the first plurality of RFID tags and the at least one of the second plurality of RFID tags; and generating a report, the report including at least one of sales statistics of products from a locational spot and a comparison of products sold from different locational spots.

19. The method of claim 18, wherein the information of the sale of the product is obtained from one of a POS system, an RFID scan, and a combination of a POS system and an RFID scan.

* * * * *